(12) United States Patent
Pfeffer et al.

(10) Patent No.: US 7,998,446 B2
(45) Date of Patent: Aug. 16, 2011

(54) FLUE GAS DESULFURIZATION PROCESS UTILIZING HYDROGEN PEROXIDE

(75) Inventors: Henry A. Pfeffer, Mercerville, NJ (US); William C. Copenhafer, Yardley, PA (US)

(73) Assignee: FMC Corporation, Philadelphia, PA (US)

( * ) Notice: Subject to any disclaimer, the term of this patent is extended or adjusted under 35 U.S.C. 154(b) by 554 days.

(21) Appl. No.: 12/111,732

(22) Filed: Apr. 29, 2008

(65) Prior Publication Data

US 2008/0264250 A1 Oct. 30, 2008

Related U.S. Application Data

(60) Provisional application No. 60/926,877, filed on Apr. 30, 2007.

(51) Int. Cl.
*B01D 53/14* (2006.01)
(52) U.S. Cl. .................. 423/243.01; 95/235; 423/539
(58) Field of Classification Search .............. 95/149, 95/187, 202, 235; 423/539, 243.01
See application file for complete search history.

(56) References Cited

U.S. PATENT DOCUMENTS

| 3,507,684 | A | * | 4/1970 | Wallen .......................... 156/44 |
| 3,733,393 | A | | 5/1973 | Couillaud et al. |
| 3,760,061 | A | | 9/1973 | Hammond |
| 4,678,481 | A | | 7/1987 | Diep |
| 4,822,577 | A | | 4/1989 | Epperly et al. |
| 5,595,713 | A | | 1/1997 | Gohara et al. |
| 5,674,459 | A | | 10/1997 | Gohara et al. |
| 6,676,912 | B1 | | 1/2004 | Cooper et al. |

FOREIGN PATENT DOCUMENTS

JP 2002224533 A * 8/2002

* cited by examiner

*Primary Examiner* — Jason M Greene
*Assistant Examiner* — Anthony Shumate (57) ABSTRACT

A flue gas desulfurization process in which a $SO_2$-containing flue gas stream is contacted with a recirculating stream of an aqueous medium containing concentrated sulfuric acid and hydrogen peroxide, to yield a desulfurized flue gas stream and to produce additional sulfuric acid in the aqueous medium. A portion of the recirculating aqueous sulfuric acid stream is diverted for recovery of the additional sulfuric acid as gypsum in a neutralization step, and the process parameters are adjusted so that the heat of reaction generated during the neutralization step is sufficient to evaporate the free water that is present and yield a gypsum product that is substantially dry.

21 Claims, 1 Drawing Sheet

Figure 1

FLUE GAS DESULFURIZATION PROCESS UTILIZING HYDROGEN PEROXIDE

CROSS REFERENCE TO RELATED APPLICATION

This application claims the benefit of U.S. Provisional Application No. 60/926,877, filed Apr. 30, 2007.

FIELD OF THE INVENTION

The present invention relates to a flue gas desulfurization process for removal of $SO_2$ from flue gas streams. More particularly, this invention relates to a $SO_2$ flue gas desulfurization process that uses a recirculating aqueous gas scrubbing stream containing sulfuric acid and hydrogen peroxide, from which gypsum is recovered as a byproduct.

BACKGROUND OF THE INVENTION

Sulfur dioxide, $SO_2$, and sulfur trioxide, $SO_3$, collectively called $SO_x$ gases, are normally formed during the combustion of fuels such as coal, coke or oil that also contain sulfur. These $SO_x$ gases are considered air pollutants, and desulfurization measures are often required to control or minimize the amounts of these gases in the flue gas streams that are released into the atmosphere. Electric utility power plants are a significant source of $SO_x$-containing combustion flue gas or waste gas streams that require desulfurization control measures.

Sulfur dioxide is the predominant $SO_x$ component in flue gas streams from sulfur-containing oil- or coal-fired combustion facilities. Methods for removing $SO_2$ are well known in the air pollution control field, and known flue gas desulfurization methods use calcium or sodium alkali sorbents, or combinations of these, in dry injection, semi-dry injection or wet scrubbing operations. Currently preferred desulfurization methods, in new high-sulfur coal-fired power plants, utilize wet scrubbing in gas-liquid contactors that use limestone or lime as the $SO_2$-reactive desulfurization agent.

Retrofitting existing older small capacity power plants with desulfurization equipment is often limited by the lack of available room, a significant issue with the installation of wet scrubbing desulfurization equipment. Dry or semi-dry scrubbing methods may not be amenable in retrofit situations, since calcium sorbents can be detrimental to existing electrostatic precipitator performance, reaction kinetics between sulfur dioxide and calcium sorbents require long gas-solid residence times for complete reaction, or the desulfurization byproduct characteristics (e.g., solubility) may not permit inexpensive disposal in a landfill.

Techniques have been described for removing sulfur dioxide from flue gas streams using oxidants such as hydrogen peroxide, $H_2O_2$. U.S. Pat. No. 5,595,713 and No. 5,674,459, both of Gohara et al. and assigned to Babcock & Wilcox, disclose equipment systems for flue gas desulfurization. The desulfurization systems of Gohara et al. produce sulfuric acid and/or calcium sulfate as byproducts but do not address the complexity of the unit operations required to recover gypsum (calcium sulfate dihydrate) as a byproduct.

The flue gas desulfurization process of this invention efficiently removes $SO_2$ contaminant from a flue gas stream, in a process that also economically produces gypsum as a substantially dry product.

SUMMARY OF THE INVENTION

In accordance with the present invention, a $SO_2$-containing flue gas stream is desulfurized in a flue gas desulfurization process which comprises (i) contacting a $SO_2$-containing flue gas stream with a recirculating stream of an aqueous medium containing concentrated sulfuric acid and hydrogen peroxide, under conditions such that $SO_2$ is absorbed from the flue gas into the aqueous medium to yield a desulfurized flue gas stream and such that the absorbed $SO_2$ reacts with the hydrogen peroxide to produce additional sulfuric acid in the aqueous medium; (ii) diverting a portion of the recirculating aqueous sulfuric acid stream for recovery of the additional sulfuric acid as gypsum in a neutralization step, in which sufficient neutralizing agent selected from limestone, lime and calcium hydroxide is introduced into the diverted aqueous medium to neutralize the sulfuric acid present and produce a gypsum product; (iii) refortifying the recirculating aqueous sulfuric acid stream with concentrated hydrogen peroxide to maintain a steady state $H_2O_2$ concentration in the recirculating aqueous sulfuric acid stream introduced into contact with the $SO_2$-containing flue gas stream; and (iv) adjusting the hydrogen peroxide concentration, the sulfuric acid concentration, and water balance in the recirculating aqueous sulfuric acid stream such that heat of reaction generated during the neutralization step is sufficient to evaporate the free water that is present and yield a gypsum product that is substantially dry.

In another embodiment of the invention, a $SO_2$-containing flue gas stream is desulfurized in a flue gas desulfurization process which comprises (i) contacting a $SO_2$-containing flue gas stream with aqueous hydrogen peroxide and with a recirculating stream of an aqueous medium containing concentrated sulfuric acid, under conditions such that $SO_2$ is absorbed from the flue gas to yield a desulfurized flue gas stream and such that the absorbed $SO_2$ reacts with the hydrogen peroxide to produce additional sulfuric acid in the aqueous medium; (ii) diverting a portion of the recirculating aqueous sulfuric acid stream for recovery of the additional sulfuric acid as gypsum in a neutralization step, in which sufficient neutralizing agent selected from limestone, lime and calcium hydroxide is introduced into the diverted aqueous medium to neutralize the sulfuric acid present and produce a gypsum product; and (iii) adjusting the hydrogen peroxide concentration, sulfuric acid concentration, and water balance in the recirculating aqueous sulfuric acid stream such that heat of reaction generated during the neutralization step is sufficient to evaporate the free water that is present and yield a gypsum product that is substantially dry.

DESCRIPTION OF THE PREFERRED EMBODIMENTS

The flue gas desulfurization process of the present invention allows older, smaller power plants burning high-sulfur coal to be easily retrofitted with the compact installation utilized in this invention and meet applicable $SO_2$ reduction requirements, at relatively low capital cost outlays. The invention not only provides efficient removal of $SO_x$ components from flue gas streams but also exhibits high utilization efficiencies for the $SO_2$-reactive reagent, hydrogen peroxide. The desulfurization process of this invention yields a solid product, gypsum, that may be utilized in the manufacture of useful byproducts, such as wallboard, or that may readily be disposed of in landfills since it is essentially water-insoluble.

A key feature of the present invention is its linkage of the $SO_x$ desulfurization operation with the optimization of an efficient gypsum recovery step. This is accomplished by using a recirculating concentrated sulfuric acid solution and aqueous hydrogen peroxide as the as $SO_2$-reactive reagent to yield additional sulfuric acid, and by generating sufficient heat during the neutralization of concentrated sulfuric acid solution that is diverted to recover a substantially dry gypsum product, as is explained below in more detail.

The flue gas desulfurization process of this invention provides a means for controlling sulfur oxide ($SO_x$) emissions, specifically sulfur dioxide ($SO_2$) and sulfur trioxide ($SO_3$), in flue gas streams or other waste gas streams containing these sulfur oxide pollutants. Sulfur dioxide and sulfur trioxide are present in flue gas streams created during the combustion of fuels that contains sulfur, such as coal, coke, oil and the like. The process of this invention may be used to treat $SO_x$-containing flue gas streams produced by combustion of all sulfur-containing fuels, whether high sulfur fuels (>1 wt % S) or low-sulfur fuels (<1 wt % S). Flue gas streams or waste gas streams that contain both sulfur dioxide and sulfur trioxide components, including sulfur trioxide at high concentration levels, are amenable to treatment by the desulfurization process of this invention.

The flue gas stream treated in the process of this invention is optionally but preferably subjected to a particulate removal step, to remove fly ash and other solid particles entrained in the flue gas stream. The particulate removal step is preferably carried out immediately prior to the desulfurization step.

One advantage to the particulate removal step is that trace metals present in the fly ash are removed from the flue gas stream prior to its contact with the $H_2O_2$-containing sulfuric acid desulfurization solution. Such trace metals may catalyze the decomposition of hydrogen peroxide, requiring higher than otherwise $H_2O_2$ usage rates in the desulfurization step. Another benefit to the particulate removal step is that the recovered gypsum solids in the process of this invention are essentially free of fly ash, allowing such high quality gypsum to be utilized in wallboard manufacture and other end use applications requiring substantially pure gypsum.

The particulate removal may be carried out using conventional equipment for removing entrained solids from a gas stream. Preferred particulate collection equipment includes bag-type fabric or membrane filter collectors (often called baghouse filters) or electrostatic precipitators; both are high efficiency systems that are widely used for particulate solids collection in flue gas treatment processes.

Other solids collection equipment and procedures may also be used for the particulate removal step instead of baghouse filters or electrostatic precipitators, for example, centrifugal separators (e.g., cyclones or venturi scrubbers) or other known filtration devices.

After the particulate removal treatment, the treated flue gas stream is introduced to the desulfurization step.

The desulfurization step involves contacting the $SO_x$-containing flue gas stream with aqueous hydrogen peroxide and a recirculating stream of aqueous sulfuric acid, to produce a desulfurized flue gas stream that exits the desulfurization step. In one embodiment of the invention, the hydrogen peroxide is present in the recirculating stream of aqueous medium containing the concentrated sulfuric acid.

In another embodiment, the aqueous hydrogen peroxide and recirculating stream of aqueous sulfuric acid are introduced into contact with the $SO_2$-containing flue gas stream in separate stages, e.g., in a multistage spray tower or absorber. The aqueous hydrogen peroxide and recirculating stream of aqueous sulfuric acid ultimately become mixed during such contact with the flue gas stream, and the sulfate formed by oxidation of $SO_2$ with the hydrogen peroxide is converted to additional sulfuric acid in the aqueous recirculating concentrated sulfuric acid stream.

In the desulfurization operation, the aqueous $H_2O_2$ and the aqueous sulfuric acid stream are introduced, either together as a single aqueous stream or as separate flow streams, into gas-liquid contacting equipment, such as a spray tower or absorber, where the $SO_2$-containing flue gas stream is contacted with the aqueous $H_2O_2$ and the aqueous sulfuric acid.

The aqueous sulfuric acid stream utilized in the desulfurization operation is concentrated with respect to sulfuric acid, containing at least about 40 wt % $H_2SO_4$. The aqueous sulfuric acid stream preferably has a concentration of at least 50 wt % $H_2SO_4$, and a concentration of at least 60 wt % $H_2SO_4$ is more preferred.

In the embodiment of this invention in which the hydrogen peroxide is present in the recirculating aqueous medium containing both hydrogen peroxide and concentrated sulfuric acid, i.e., a $H_2O_2$-containing concentrated sulfuric acid stream, the following hydrogen peroxide concentrations are applicable. The hydrogen peroxide concentration in the $H_2O_2$-containing concentrated sulfuric acid stream introduced into the desulfurization step may be in the range of about 1 wt % $H_2O_2$ to about 20 wt % $H_2O_2$ but is preferably in the range of about 2 wt % $H_2O_2$ to about 15 wt % $H_2O_2$, more preferably in the range of about 3 wt % $H_2O_2$ to about 10 wt % $H_2O_2$.

In the alternative embodiment of this invention in which the aqueous hydrogen peroxide and the recirculating aqueous medium containing sulfuric acid are introduced to the desulfurization step as separate streams, the following hydrogen peroxide concentrations are applicable. The hydrogen peroxide concentration in the separate aqueous $H_2O_2$ solution stream introduced into the desulfurization step may be in the range of about 5 wt % $H_2O_2$ to about 50 wt % $H_2O_2$ but is preferably in the range of about 8 wt % $H_2O_2$ to about 35 wt % $H_2O_2$, more preferably in the range of about 10 wt % $H_2O_2$ to about 30 wt % $H_2O_2$.

In the desulfurization step, the $SO_x$-components in the flue gas stream are absorbed, i.e., dissolved, into the aqueous hydrogen peroxide and aqueous sulfuric acid. The absorbed $SO_2$ reacts with the aqueous $H_2O_2$ and is oxidized to $SO_3$. In the aqueous solution, the $SO_3$ combines with water and becomes converted to aqueous sulfuric acid. In addition to $SO_2$ that is absorbed from the $SO_x$-containing flue gas stream, $SO_3$ is likewise absorbed from the flue gas stream and becomes converted into sulfuric acid in the aqueous solution.

The desulfurization scrubbing mechanism involves more than simple gas absorption since there is a rapid chemical reaction between absorbed sulfur dioxide and aqueous hydrogen peroxide introduced into the desulfurization step, to oxidize absorbed $SO_2$ into $SO_3$. In addition, $SO_3$ in the aqueous solution combines with water to form sulfuric acid. The reactions of the desulfurization step in the process of this invention may be summarized as follows:

$$H_2O_2 + SO_2 \rightarrow SO_3 + H_2O \quad (1)$$

$$SO_3 + H_2O \rightarrow H_2SO_4 \quad (2)$$

Reaction (2) applies not only to sulfur dioxide that is oxidized to $SO_3$ by reaction with hydrogen peroxide but also to $SO_3$ that is absorbed from the $SO_x$-containing flue gas stream into the aqueous medium.

The net result during the desulfurization operation is that the aqueous concentrated sulfuric acid solution stream becomes even more concentrated, through the addition of the sulfuric acid derived from desulfurization of the $SO_x$-containing flue gas stream. The aqueous sulfuric acid stream may also become concentrated further in situations where water is evaporated from the aqueous stream in the desulfurization tower or absorber and is lost in the exiting desulfurized flue gas stream.

The desulfurization of the flue gas stream results in a depletion of hydrogen peroxide in the aqueous sulfuric acid stream that is withdrawn or exits from the desulfurization operation, since most if not all of the incoming hydrogen peroxide becomes oxidized to water in its reaction with $SO_2$. One advantage of the use of hydrogen peroxide as a desulfurizing agent is its rapid reactivity with $SO_2$, so that residual hydrogen peroxide in the exiting aqueous stream is minimal and overall hydrogen peroxide utilization is high.

The desulfurization step may be carried out in conventional gas-liquid contacting equipment, such as a spray tower or absorber. In a typical absorber design, the $SO_x$-containing flue gas stream is directed in an upward flow through the absorber with the aqueous medium flowing downwards, for countercurrent contact, through the absorber. The aqueous medium absorbs $SO_2$ from the flue gas stream, which then leads to reaction of the $SO_2$ with hydrogen peroxide in the aqueous medium.

In the present invention, the use of a spray tower is preferred in which the incoming $H_2O_2$-containing aqueous sulfuric acid stream or a separate aqueous hydrogen peroxide stream is sprayed in the form of droplets into the flue gas stream. The spray tower is preferably fitted with banks of spray nozzles, such that the flue gas stream flows upwards through the tower and is contacted with sprayed droplets of the $H_2O_2$-containing aqueous solution during the flue gas stream travel, the droplets being collected at the bottom of the spray tower.

In the embodiment with separate addition of aqueous hydrogen peroxide and aqueous concentrated sulfuric acid, the latter may be contacted with the $SO_x$-containing flue gas stream as a spray or gas-liquid sieve trays or both.

The aqueous solution is collected at the bottom of the absorber or spray tower after its contact with the upward-flowing flue gas stream, and this is typically accomplished in a liquid collection or reaction tank, which may be integral with the absorber/tower or a separate vessel.

The incoming $SO_x$-containing flue gas stream may optionally be sparged through the reservoir of collected solution at the bottom of the tower to promote better contact efficiency between the liquid and gas phases, before the incoming flue gas stream is contacted with the sprayed droplets in the tower upper sections of the tower.

In the desulfurization step of this invention, a substantial portion, at least about half, of the $SO_2$ in the $SO_x$-containing flue gas stream is removed by contact with the $H_2O_2$-containing aqueous sulfuric acid stream or separate aqueous hydrogen peroxide and aqueous concentrated sulfuric acid streams. In the process of this invention, the operating parameters of the desulfurization operation may be adjusted to provide removal of at least about 80% of the $SO_2$ in the flue gas stream introduced to this step and, more preferably, at least about 90% of the $SO_2$ in the $SO_x$-containing flue gas stream.

The $SO_2$ removal (or collection) efficiency in the desulfurization operation may be controlled by selection and adjustment of the relative amount of $H_2O_2$-containing aqueous solution contacted with the flue gas stream in the spray tower, absorber or other gas-liquid contacting device. High liquid-to-gas (L/G) ratios improve $SO_2$ removal from the gas stream by exposing the $SO_2$ in the gas stream to more of the liquid and, consequently, to more of the $SO_2$-reactive $H_2O_2$ reagent in the aqueous medium. However, high L/G ratios require more power for effecting higher throughput flows of the absorbing liquid, so a balance is normally struck between the desired $SO_2$-collection efficiency and overall economics of the desulfurization process at a given collection efficiency.

The sulfur oxides, $SO_2$ and $SO_3$, that are absorbed into the $H_2O_2$-containing concentrated sulfuric acid stream during the desulfurization step are recovered from the $H_2O_2$-depleted concentrated sulfuric acid stream exiting from the desulfurization step in the gypsum recovery step. The gypsum recovery step serves to maintain the overall sulfur material balance in the continuously-operated desulfurization process, by removing the sulfur from the recirculating stream in the form of gypsum and thereby maintaining a steady state sulfur material balance in the recirculating concentrated sulfuric acid stream.

A portion of the $H_2O_2$-depleted concentrated sulfuric acid stream exiting from the desulfurization step is diverted from the recirculating stream and is directed to the gypsum recovery step. The proportion of the overall recirculating stream that is diverted will depend on the amount of sulfur, as sulfuric acid, that needs to be removed from the system to maintain steady state operation, and this amount of course depends on the amount of sulfur oxides removed from the flue gas stream during the desulfurization step and converted to additional sulfuric acid in the recirculating stream.

The proportion of the overall recirculating stream that is diverted to the gypsum recovery may vary widely, depending on the recirculating stream flow rate, and may range from about 2% to about 50% or more. Preferably, the proportion of the overall recirculating stream that is diverted to the gypsum recovery will be in the range of about 5% to about 40%, and more preferably, in the range of about 10% to about 30%.

The concentration of hydrogen peroxide in the $H_2O_2$-depleted concentrated sulfuric acid stream exiting from the desulfurization step is normally very low, if not completely depleted. In the event that there is a residual concentration of $H_2O_2$ in the $H_2O_2$-depleted concentrated sulfuric acid stream exiting from the desulfurization step, such residual $H_2O_2$ is preferably minimized in the portion of the recirculating stream that is diverted to gypsum recovery. The calcium neutralizing agent will also react with hydrogen peroxide in the gypsum recovery step, but it is preferable, for economic reasons, to decompose any residual hydrogen peroxide concentration in the diverted stream prior to the gypsum recovery operation, and such decomposition can be accomplished by heating or catalytic decomposition of the hydrogen peroxide in the aqueous sulfuric acid stream.

The gypsum recovery is accomplished by neutralization of the sulfuric acid in the diverted $H_2O_2$-depleted concentrated sulfuric acid stream, using a neutralizing agent that is a calcium alkali, which provides a calcium source for formation of gypsum, $CaSO_4.2 H_2O$, in the neutralization reaction.

Preferred calcium alkali neutralizing agents include limestone, $CaCO_3$; lime or calcined limestone, $CaO$; and hydrated or slaked lime (calcium hydroxide) $Ca(OH)_2$. Limestone is especially preferred as the neutralizing agent, since it is the least expensive of the named neutralizing agents.

The solid neutralization agents, e.g., limestone or lime, are preferably employed as a finely-ground or finely-divided particulate solid, to provide enhanced surface area that facilitates a rapid neutralization reaction with the sulfuric acid in the diverted feed steam.

The neutralization reaction in the gypsum recovery step involves the reaction of limestone with sulfuric acid in the diverted $H_2O_2$-depleted aqueous concentrated sulfuric acid stream, as follows:

$$CaCO_3(s) + H_2SO_4(l) + xH_2O(l) \rightarrow CaSO_4 \cdot 2H_2O(s) + CO_2(g) + (x-1)H_2O(g) \qquad (3)$$

The amount of neutralizing agent, limestone, lime or slaked lime, that is employed in the gypsum recovery step is normally a stoichiometric amount, relative to the sulfuric acid being neutralized. If the gypsum product is destined for use in wallboard manufacture, gypsum product quality is important and the presence of excess neutralizing agent is normally minimized, through use of stoichiometric or near-stoichiometric (<5% excess) amounts of the neutralizing agent.

In situations where the gypsum product is destined for disposal, e.g., in a landfill, a stoichiometric excess of solid neutralizing agent (limestone or lime) may be desirable for operational reasons. A stoichiometric excess, e.g., a 5-20% excess, has the advantage of providing additional reactive solids in the liquid-solid neutralization reaction, which can promote faster neutralization and drying of the gypsum reaction product.

The neutralization involves mixing of (i) a solid (limestone or lime) or slurried feed (slaked lime; or lime/limestone slurried in the aqueous sulfuric acid or slurried in makeup water, if used) and (ii) aqueous concentrated sulfuric acid. The neutralization reaction mixture yields (iii) substantially dry gypsum solids and (iv) water vapor and carbon dioxide vapor.

Equipment suitable for carrying out the neutralization reaction and gypsum recovery include conventional solid-liquid mixing and drying devices or mixing-milling devices. Pug mills, ribbon blenders, rotary hydrators, spray agglomerators, spray fluid beds and the like may be used.

One alternative technique for producing the substantially dry gypsum product involves introducing both the neutralizing agent, e.g., limestone, and the concentrated sulfuric acid stream to a stirred tank reactor, permitting the water vapor and carbon dioxide to degas, filtering the gypsum solids to yield the product, and recycling the filtrate to the stirred tank.

Another technique for producing the substantially dry gypsum product involves adding the sulfuric acid stream to the limestone to neutralize the former and then adding lime to the solids mixture to ensure that any residual sulfuric acid in the solids mixture is completely neutralized, for safety and subsequent ease of handling of the resulting gypsum product.

Neutralization of the sulfuric acid with limestone or other neutralizing agent is carried out in a manner that utilizes its exothermic heat of reaction to evaporate water present in the aqueous concentrated sulfuric acid stream. The neutralization reaction provides a means for the recovery of substantially dry gypsum, without the addition of external heat to accomplish the drying step when the amount of water is properly controlled. In other words, the heat evolved from neutralization of the acid with limestone or other neutralizing agent must be at least as great as the amount of heat required to evaporate substantially all of the water from the system.

Production of gypsum from the limestone-neutralization of aqueous sulfuric acid solutions, having a concentration of less than about 62 wt % $H_2SO_4$, will typically require additional heat, normally from external sources. For example, a slurry formed by reaction of limestone and dilute sulfuric acid (<<60 wt %) will require the input of heat, typically via steam, to evaporate essentially all of the free water, crystallize gypsum and yield a substantially dry gypsum product.

Production of gypsum from the limestone-neutralization of concentrated aqueous sulfuric acid solutions containing more than about 62 wt % $H_2SO_4$, will typically generate a net exothermic heat of reaction. Such heat can be utilized, as in this invention, to form gypsum with the concomitant evaporation of the free water that is present. The present invention utilizes this characteristic of concentrated sulfuric acid solutions, by specifically adjusting the water balance and sulfuric acid concentration in the recirculating sulfuric acid stream, to supply sufficient heat during the exothermic neutralization reaction to evaporate free water, without the addition of external supplemental (steam) heat, to yield a substantially dry gypsum product.

An optimal sulfuric acid concentration for use in this invention may be determined by a mass and heat balance calculation for the gypsum recovery step. In the heat balance calculation, additional factors need to be taken into account. The choice of neutralizing agent i.e., limestone, lime, or hydrated lime, will affect the heat of reaction. Furthermore, there will be process equipment heat losses (or gains) and vapor stream heat losses, which will likely vary seasonally. The heat generated during the neutralization reaction, in this invention, is sufficient to evaporate substantially all of the free water present in the aqueous sulfuric acid stream being neutralized. The overall net heat of reaction, exothermic vs. endothermic, is controlled via selection of process parameters to yield a substantially dry gypsum product.

The gypsum recovery of the present invention contrasts with conventional gypsum production in prior art flue gas desulfurization methods, where drying heat is typically supplied to the gypsum-water mixture via steam in heat exchangers. A significant drawback to the prior art gypsum production methods, which rely on heat exchangers to, is that calcium sulfate salts are notorious for scale formation on equipment surfaces at high temperatures, requiring frequent scale removal in elevated temperature heat exchange operations.

The process of this invention also eliminates the multiple operations involved in recovering gypsum in prior art methods, where wet calcium sulfate solids, in the form of an aqueous slurry of calcium sulfate solids, are processed for recovery of gypsum solids. The slurry is typically passed to a thickener, to concentrate the solids by settling, then to a hydroclone and/or vacuum filter for dewatering of the concentrated slurry solids, and finally to a drying step to provide a dry gypsum product.

Substantially dry gypsum refers to a gypsum byproduct that requires no further drying before it is readied for shipment to another site or stored for subsequent processing into a useful end product such as wallboard. Substantially dry gypsum typically has a free moisture content ("free" water does not include the hydrated water associated with gypsum, i.e., as $CaSO_4 \cdot 2 H_2O$) of less than about 10 wt % water, and more preferably, less than about 5 wt % water.

The gypsum product (calcium sulfate dihydrate) of this invention is a dry solid, so subsequent handling, transport and storage operations are relatively straightforward, requiring no special procedures.

The gypsum product is a useful commodity that has value in a number of end use applications. The dry gypsum product may be processed further, as a component in the manufacture of wallboard for the building industry, an end use that recovers economic value from this flue gas desulfurization product. Other end use applications for the gypsum product of this invention include as an agricultural soil conditioner, as an additive to concrete, and the like.

The dry gypsum product is essentially insoluble in water and may alternatively be disposed of in a landfill, either as is or blended with fly ash. For example, the gypsum solids may be mixed with fly ash recovered in the optional particulate removal operation for disposal in a landfill.

The $H_2O_2$-depleted concentrated sulfuric acid stream exiting from the desulfurization step is recirculated, i.e., recycled, to the desulfurization step for reuse, after the depleted hydrogen peroxide has been replenished to restore the desired hydrogen peroxide concentration, in the embodiment of this invention in which the hydrogen peroxide is present in the concentrated sulfuric acid stream introduced to the desulfurization step.

The hydrogen peroxide refortification is carried out on the recirculating aqueous stream that is recycled to the desulfurization step. The portion of the recirculating aqueous sulfuric acid stream that is diverted for gypsum recovery should not contain hydrogen peroxide, since the peroxide would interfere with the reaction between the sulfuric acid and calcium neutralizing agent. Hydrogen peroxide refortification of the recirculating sulfuric acid stream is therefore carried out downstream of the point where a portion of the recirculating stream is diverted for neutralization and recovery of gypsum.

The hydrogen peroxide refortification is carried out as a mixing step, in which concentrated hydrogen peroxide is mixed with the recirculating $H_2O_2$-depleted concentrated sulfuric acid stream to restore the latter's hydrogen peroxide content prior to its introduction to the desulfurization step. The mixing operation may be carried out using conventional mixing devices, including mixing tanks or inline mixing devices.

The hydrogen peroxide feed source used in the refortification step is concentrated hydrogen peroxide, having a concentration in the range of from about 15 wt % $H_2O_2$ to about 60 wt % $H_2O_2$ or even higher. The hydrogen peroxide concentration is preferably in the range of about 25 wt % $H_2O_2$ to about 50 wt % $H_2O_2$. Commercial grades of hydrogen peroxide having concentrations of up to about 40 wt % $H_2O_2$ are preferred, since these concentrations are normally produced in commercial hydrogen peroxide production. Currently-offered commercial grades of hydrogen peroxide in excess of about 40 wt % $H_2O_2$ normally require additional concentration steps, e.g., distillation, to yield higher concentration grades, e.g., 50 wt % $H_2O_2$, which are more expensive and are therefore less preferred for the present invention.

The hydrogen peroxide feed source may be used to adjust or control the water balance in the desulfurization process of this invention. The concentrated hydrogen peroxide feed may also be introduced in combination with water, for additional adjustment or control of the desulfurization system water balance.

The hydrogen peroxide concentration in the $H_2O_2$-containing concentrated sulfuric acid stream introduced into the desulfurization step may be in the range of about 1 wt % $H_2O_2$ to about 20 wt % $H_2O_2$ but is preferably in the range of about 2 wt % $H_2O_2$ to about 15 wt % $H_2O_2$, more preferably in the range of about 3 wt % $H_2O_2$ to about 10 wt % $H_2O_2$.

The following non-limiting Examples illustrate preferred embodiments of the present invention.

Example 1

Figure 1:
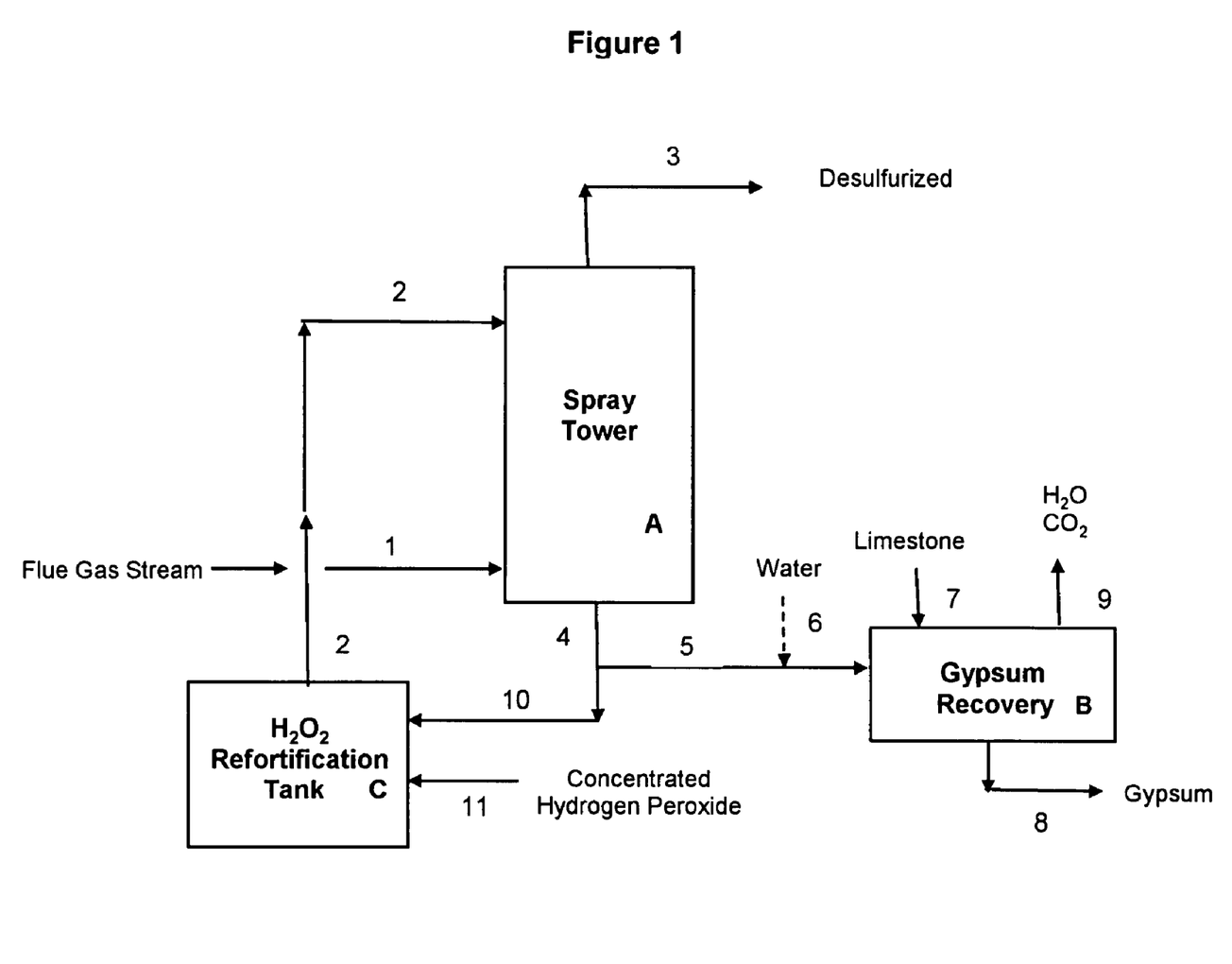
FIG. 1 is a schematic flow diagram illustrating preferred embodiments of the flue gas desulfurization process of this invention, that are described in the Examples.

Example 1 illustrates a preferred embodiment of the present invention, using a concentrated sulfuric acid scrubber liquor stream also containing hydrogen peroxide, for desulfurization of a flue gas stream from a combustion boiler utilizing high sulfur coal. The desulfurization process of this Example 1 is operated in a manner that requires no input of external heat to the gypsum precipitation and recovery step. FIG. 1 illustrates a schematic flow diagram of this preferred embodiment; reference numerals and letters in the drawing are included in the process description which follows.

The flue gas composition in this Example 1 (and in subsequent Examples) is obtained from combustion of high sulfur coal containing 2.5 wt % sulfur, burned using 10% excess air. The flue gas composition is shown in Table 1.

TABLE 1

| Flue Gas Composition | | |
|---|---|---|
| Component | Concentration: Wt Basis | Concentration: Volume Basis |
| $SO_2$ | 0.49 wt % | 0.22 vol % |
| $SO_3$ | 49 ppmw | 18 ppmv |
| $H_2O$ | 5.6 wt % | 9.0 vol % |
| $CO_2$ | 22.7 wt % | 15.0 vol % |
| Other Gases | 71.2 wt % | 75.8 vol % |

The $SO_2$ concentration in the flue gas stream is relatively high, as would be expected from the burning of high sulfur coal. The "other gases" are mostly nitrogen ($N_2$) but also comprise other gaseous components typically found in combustion flue gas streams such as oxygen ($O_2$), and nitrogen oxides ($NO_x$).

The process is operated continuously, and normal steady state conditions are assumed for purposes of this Example 1 and subsequent Examples. The flue gas stream flow rate is based on rates typical for a 50 MW power plant coal-fired combustion boiler, which consumes 31,250 lb/hr coal and yields 321,785 lb/hr flue gas. Flow rates for individual components in the flue gas are shown in Table 2.

TABLE 2

| Flue Gas Stream Flow Rate | |
|---|---|
| Component | Flow Rate (lb/hour) |
| $SO_2$ | 1,569 |
| $SO_3$ | 16 |
| $H_2O$ | 17,969 |
| $CO_2$ | 73,047 |
| Other Gases | 229,184 |
| Flue Gas Total | 321,785 |

This Example 1 and subsequent Examples utilize a 1% excess of the theoretical hydrogen peroxide required to oxidize the sulfur dioxide in the flue gas stream to sulfate. Other operating assumptions, based on commercial practice, are that the overall $SO_2$ scrubbing efficiency in the desulfurization step is 98%, so that 2% of the sulfur dioxide in the flue gas stream is not absorbed and remains in the exiting flue gas stream leaving the desulfurization step. In addition, all of the $SO_3$ present in the flue gas stream is assumed to be absorbed into the recirculating aqueous sulfuric acid scrubber liquor as sulfuric acid. The $CO_2$ present in the flue gas stream passes through the desulfurization step without being absorbed into the aqueous sulfuric acid scrubber liquor, since the latter is strong acid solution that does not favor absorption of a weak acid gas.

Heat losses and gains in process equipment are assumed for purposes of the Examples to be negligible. In actual commercial practice, the process parameters (e.g., hydrogen peroxide make-up strength, recirculating sulfuric acid solution strength, spray tower operating temperature, and make-up water (if any) added to the gypsum recovery feed streams, etc.) would be adjusted to compensate for process equipment heat losses and seasonal variations in ambient temperature.

The flue gas stream from the combustion boiler is passed to an electrostatic precipitator, to remove entrained fly ash and other particulates from the gas stream. The recovered particulate solids are discarded.

Referring now to FIG. 1, the desulfurization step is carried out in a spray tower A, in which the flue gas stream 1, at a flow rate of 321,785 lb/hr, is introduced into the bottom of the tower A and is contacted counter currently with a recirculating aqueous stream 2, via aqueous spray from a series of spray banks in the tower. The recirculating aqueous stream 2 is introduced into the spray tower A at a flow rate of 11,410 lb/hr and contains 52.6 wt % concentrated sulfuric acid and 7.4 wt % hydrogen peroxide.

The spray tower operation is such that the intimate contact between the spray droplets of aqueous medium 2 with the flue gas stream 1 results in the absorption of sulfur dioxide and sulfur trioxide into the aqueous medium. The reaction of sulfur dioxide with aqueous hydrogen peroxide forms aqueous sulfuric acid, with 98% of the sulfur dioxide in the flue gas stream being removed in this desulfurization step. Sulfur trioxide is also absorbed from the flue gas stream and reacts with water in the spray droplets, forming sulfuric acid. A small amount of water in the incoming flue gas stream, less than 2%, is absorbed into the recirculating aqueous sulfuric acid.

The desulfurized flue gas stream 3 exits from the spray tower at a flow rate of 319,620 lb/hr and contains 100 ppmw $SO_2$, no $SO_3$, 5.4 wt % $H_2O$, 22.8 wt % $CO_2$ and 71.7 wt % other gases. The $H_2O_2$-depleted aqueous stream 4 exits the spray tower A at a flow rate of 13,574 lb/hr and contains no $H_2O_2$ but is now more concentrated in its sulfuric acid content, containing 61.7 wt % $H_2SO_4$ (versus 52.6 wt % $H_2SO_4$ in the incoming stream 2.)

A portion 5, about 28%, of the $H_2O_2$-depleted aqueous concentrated sulfuric acid stream 4 is diverted to the gypsum byproduct recovery step B, where finely-ground limestone 7 is mixed with the diverted concentrated sulfuric acid stream 5 to form gypsum, $CaSO_4 \cdot 2H_2O$. In the gypsum recovery step B, the limestone 7, in an amount of 2,420 lb/hr, is mixed in a rotary hydrator with the concentrated sulfuric acid stream, introduced at a flow rate of 3,850 lb/hr, to form 4,160 lb/hr of gypsum 9, $CaSO_4 \cdot 2H_2O$. The neutralization reaction in the gypsum recovery operation B results in the evolution of carbon dioxide and water vapor, 9.

The gypsum recovery step B is carried out without the addition of external heat, yet yields a substantially dry gypsum product 8. The gypsum formation heat of reaction is sufficient to evaporate water, at a rate of 1,038 lb/hr $H_2O$, with the concurrent removal of carbon dioxide reaction byproduct, at a rate of 1,065 lb/hr $CO_2$, shown as stream 9, during the gypsum recovery step B. In the operation of the gypsum recovery B in this Example 1, there is no need for the optional addition of supplemental water 6, so stream 6 is shown as a dotted line in FIG. 1.

The balance 10 of the $H_2O_2$-depleted aqueous concentrated sulfuric acid stream 4 exiting the spray tower A is recirculated for reuse in the desulfurization step. The aqueous concentrated sulfuric acid stream 10, at a flow rate of 9,730 lb/hr, is first refortified with concentrated hydrogen peroxide, 50 wt % $H_2O_2$, which is introduced as stream 11 at a flow rate of 1,680 lb/hr, in the hydrogen peroxide refortification tank C. The resulting $H_2O_2$-refortified aqueous sulfuric acid stream 2 containing 52.6 wt % sulfuric acid and 7.4 wt % hydrogen peroxide is recirculated to the desulfurization step A spray tower, as described previously.

Example 2

Example 2 illustrates another preferred embodiment of the present invention, using a concentrated sulfuric acid scrubber liquor stream also containing hydrogen peroxide, for desulfurization of a flue gas stream from a combustion boiler utilizing high sulfur coal. The desulfurization process of this Example 2, like that of Example 1, is operated in a manner that requires no input of external heat to the gypsum precipitation and recovery step. In Example 2, the concentration of the make-up hydrogen peroxide 11 used to fortify the recirculating aqueous sulfuric acid stream 10 (see FIG. 1) is 36.7 wt % $H_2O_2$, as compared with 50 wt % $H_2O_2$ used in Example 1.

The flue gas stream used in Example 2 is identical to that of Example 1, but the recirculating aqueous sulfuric acid stream has a slightly different composition and flow rate. In the desulfurization step, the recirculating aqueous stream 2 is introduced into the spray tower A at a flow rate of 12,020 lb/hr and contains 49.9 wt % concentrated sulfuric acid and 7.0 wt % hydrogen peroxide, and is contacted with the flue gas stream 1 introduced at a flow rate of 321,785 lb/hr.

The desulfurized flue gas stream 3 exits from the spray tower at a flow rate of 320,230 lb/hr and contains 100 ppmw $SO_2$, no $SO_3$, 5.6 wt % $H_2O$, 22.8 wt % $CO_2$ and 71.6 wt % other gases. The $H_2O_2$-depleted aqueous stream 4 exits the spray tower A at a flow rate of 13,570 lb/hr (the same rate as in Example 1) and contains no $H_2O_2$ but is now more concentrated in its sulfuric acid content, containing 61.7 wt % $H_2SO_4$ (versus 49.9 wt % $H_2SO_4$ in the incoming stream 2.)

The gypsum recovery step B is carried out in this Example 2 in a manner identical to that described in Example 1, with flow rates being the same and with a substantially dry gypsum product 8 being produced at a rate of 4,160 lb/hr, again without the need for external heat addition for drying the gypsum.

In the hydrogen peroxide fortification step C, the recirculating $H_2O_2$-depleted aqueous concentrated sulfuric acid stream 10 is fortified with the addition of 36.7 wt % hydrogen peroxide 11. In the refortification step, 2,300 lb/hr of 36.7 wt % $H_2O_2$ is introduced as stream 11 to the $H_2O_2$-depleted aqueous concentrated sulfuric acid stream 10 to yield a refortified aqueous sulfuric acid stream 2 containing 49.9 wt % sulfuric acid and 7.0 wt % hydrogen peroxide that is introduced to the desulfurization step A spray tower, as described previously.

This Example demonstrates that the embodiments of the present invention can be carried out with a range of make-up hydrogen peroxide concentrations, while still achieving the objective of a substantially dry gypsum byproduct without the addition of external heat, all drying heat being provided by the heat of reaction from the neutralization reaction of concentrated sulfuric acid with limestone.

Example 3

Example 3 illustrates yet another preferred embodiment of the present invention, using a concentrated sulfuric acid scrubber liquor stream also containing hydrogen peroxide, for desulfurization of a flue gas stream from a combustion boiler utilizing high sulfur coal. The desulfurization process of this Example 3, like that of Examples 1 & 2, is operated in a manner that requires no input of external heat to the gypsum precipitation and recovery step B, shown in FIG. 1. In Example 3, the concentration of the make-up hydrogen peroxide 11 used to fortify the recirculating aqueous sulfuric acid stream 10 (see FIG. 1) is again 36.7 wt % $H_2O_2$, as in Example 2.

The spray tower A in Example 3 is operated at a higher temperature than that assumed for Example 2, leading to higher water evaporation rates. In Example 2, no net water was evaporated during the desulfurization step in the spray tower A, i.e., the water vapor in the incoming flue gas stream 1 was identical to that present in the exiting flue gas stream 3, so there was no net loss or gain in the water balance. In this Example 3, there is a net loss of water in the spray tower operation A via the exiting flue gas stream 3. Example 3 illustrates how this water loss is compensated by make up water 6 added to the aqueous sulfuric acid stream 5 introduced to the gypsum recovery step B.

The flue gas stream 1 used in Example 3 is identical to that of Examples 1 and 2, but the recirculating aqueous sulfuric acid stream 2 has higher sulfuric acid and hydrogen peroxide concentrations and a lower flow rate than in the previous two Examples. In the desulfurization step A of Example 3, the recirculating aqueous stream 2 is introduced into the spray tower A at a flow rate of 9,410 lb/hr and contains 63.7 wt % concentrated sulfuric acid and 8.9 wt % hydrogen peroxide, and is contacted with the flue gas stream 1 introduced at a flow rate of 321,785 lb/hr.

The desulfurized flue gas stream 3 exits from the spray tower A at a flow rate of 321,260 lb/hr and contains 100 ppmw $SO_2$ $SO_2$, no $SO_3$, 5.9 wt % $H_2O$, 22.7 wt % $CO_2$ and 71.3 wt % other gases. The $H_2O_2$-depleted aqueous stream 4 exits the spray tower A at a flow rate of 9,930 lb/hr (versus 13,570 lb/hr in the first two Examples) and contains no $H_2O_2$ but is now more concentrated in its sulfuric acid content, containing 84.3 wt % $H_2SO_4$ (versus 63.7 wt % $H_2SO_4$ in the incoming stream 2.)

The gypsum recovery step B is carried out in this Example 3 in a manner that differs from that of Examples 1 & 2, since make-up water 6 is added to the $H_2O_2$-depleted aqueous concentrated sulfuric acid stream 5. As in the first two Examples, 28% of the $H_2O_2$-depleted aqueous concentrated sulfuric acid stream 4 exiting the spray tower is diverted to the gypsum recovery step. The diverted stream 5, at a flow rate of 2,810 lb/hr is diluted with 1,030 lb/hr of make-up water, before the stream is contacted with 2,420 lb/hr ground limestone 7 (the same amount as in Examples 1 & 2) in the gypsum recovery step B. The heat of reaction generated from the reaction between limestone 7 and sulfuric acid during the gypsum recovery step C is sufficient to produce a substantially dry gypsum product 8, at a rate of 4,160 lb/hr, again without the need for external heat addition for drying the gypsum.

In the hydrogen peroxide fortification step C, the recirculating $H_2O_2$-depleted aqueous concentrated sulfuric acid stream 10 is fortified with the addition of 36.7 wt % hydrogen peroxide (the same concentration used in Example 2). In the refortification step C, 2,300 lb/hr of 36.7 wt % $H_2O_2$ is introduced as stream 11 to the $H_2O_2$-depleted aqueous concentrated sulfuric acid stream 10 to yield a refortified aqueous sulfuric acid stream 2 containing 63.7 wt % sulfuric acid and 8.9 wt % hydrogen peroxide that is introduced to the desulfurization step spray tower A, as described previously.

Example 4

Example 4 illustrates still another preferred embodiment of the present invention, using a concentrated sulfuric acid scrubber liquor stream also containing hydrogen peroxide, for desulfurization of a flue gas stream from a combustion boiler utilizing high sulfur coal. The desulfurization process of this Example 4, like that of Examples 1-3, is operated in a manner that requires no input of external heat to the gypsum precipitation and recovery step. In Example 4, the concentration of the make-up hydrogen peroxide 11 used to fortify the recirculating aqueous sulfuric acid stream 10 (see FIG. 1) is only 30 wt % $H_2O_2$ (versus 36.7 wt % $H_2O_2$ used in Examples 2 & 3 and 50 wt % $H_2O_2$ used in Example 1.)

The spray tower A in Example 4, as in Example 3, is operated at a higher temperature than that assumed for Example 2, leading to higher water evaporation rates. In Example 3, the previous Example, the water evaporation losses in the desulfurization step in the spray tower A were compensated by the addition of water 6 to the diverted aqueous sulfuric acid stream 5 introduced to the gypsum recovery step B. In this Example 4, there is again a net loss of water in the spray tower operation A via the exiting flue gas stream 3, similar to the situation in Example 3. Example 4 illustrates how this water loss may be compensated by using a more dilute makeup hydrogen peroxide 11, instead of as in Example 3 where make-up water 6 was added to the aqueous sulfuric acid stream 5 introduced to the gypsum recovery step B.

The flue gas stream 1 used in Example 4 is identical to that of Examples 1-3. The recirculating aqueous sulfuric acid stream 2 has a sulfuric acid concentration, hydrogen peroxide concentration and flow rate approximating that used in Example 2. In the desulfurization step of this Example 4, the recirculating aqueous stream 2 is introduced into the spray tower A at a flow rate of 12,530 lb/hr and contains 47.9 wt % concentrated sulfuric acid and 6.7 wt % hydrogen peroxide, and is contacted with the flue gas stream 1 introduced at a flow rate of 321,785 lb/hr.

The desulfurized flue gas stream 4 exits from the spray tower at a flow rate of 320,740 lb/hr and contains 100 ppmw $SO_2$, no $SO_3$, 5.8 wt % $H_2O$, 22.8 wt % $CO_2$ and 71.4 wt % other gases. The $H_2O_2$-depleted aqueous stream 4 exits the spray tower at a flow rate of 13,570 lb/hr (as in Examples 1 & 2) and contains no $H_2O_2$ but is now more concentrated in its sulfuric acid content, containing 61.7 wt % $H_2SO_4$ (versus 47.9 wt % $H_2SO_4$ in the incoming stream 2.)

The gypsum recovery step B is carried out in this Example 4 is identical to that carried out in Examples 1 & 2, with flow rates being the same and with a substantially dry gypsum byproduct 8 being produced at a rate of 41,160 lb/hr, again without the need for external heat addition for drying the gypsum.

In the hydrogen peroxide fortification step C, the recirculating $H_2O_2$-depleted aqueous concentrated sulfuric acid stream 10 is fortified with the addition of 30 wt % hydrogen peroxide 11, a more dilute concentration than used in the previous three Examples and one which serves to replace water lost in the flue gas stream 3 exiting the spray tower A. In the refortification step C, 2,810 lb/hr of 30 wt % $H_2O_2$ is introduced as stream 11 to the $H_2O_2$-depleted aqueous concentrated sulfuric acid stream 10 to yield a refortified aqueous sulfuric acid stream 2 containing 47.9 wt % sulfuric acid and 6.7 wt % hydrogen peroxide that is introduced to the desulfurization step A spray tower, as described previously.

It will be appreciated by those skilled in the art that changes could be made to the embodiments described above without departing from the broad inventive concept thereof. It is understood, therefore, that this invention is not limited to the particular embodiments disclosed but is intended to cover modifications within the spirit and scope of the present invention as defined by the appended claims.

What is claimed is:
1. A flue gas desulfurization process which comprises
   (i) contacting a $SO_2$-containing flue gas stream with a recirculating stream of an aqueous medium containing concentrated sulfuric acid of at least 40 wt % $H_2SO_4$ and hydrogen peroxide, under conditions such that $SO_2$ is absorbed from the flue gas into the aqueous medium to yield a desulfurized flue gas stream and such that the absorbed $SO_2$ reacts with the hydrogen peroxide to produce additional sulfuric acid in the recirculating stream;

(ii) diverting a portion of the recirculating aqueous sulfuric acid stream for recovery of the additional sulfuric acid as gypsum in a neutralization step, in which sufficient neutralizing agent selected from limestone, lime and calcium hydroxide is introduced into the diverted aqueous sulfuric acid stream portion to neutralize the sulfuric acid present and produce a gypsum product;

(iii) refortifying the recirculating aqueous sulfuric acid stream with concentrated hydrogen peroxide to maintain a steady state $H_2O_2$ concentration in the recirculating aqueous sulfuric acid stream introduced in step (i) into contact with the $SO_2$-containing flue gas stream; and (iv) evaporating free water from the diverted and neutralized portion of the recirculating aqueous sulfuric acid stream, using the heat of reaction generated during the neutralization step, to yield a gypsum product that is substantially dry.

2. The process of claim 1 which further comprises removing entrained particulate matter from the $SO_2$-containing flue gas stream prior to its desulfurization.

3. The process of claim 1 where the $SO_2$-containing flue gas stream is contacted with the recirculating aqueous medium stream in a spray tower.

4. The process of claim 1 wherein the neutralizing agent is limestone.

5. The process of claim 1 wherein the hydrogen peroxide concentration in the recirculating stream of aqueous sulfuric acid of step (i) is about 1 wt % $H_2O_2$ to about 20 wt % $H_2O_2$.

6. The process of claim 1 wherein the hydrogen peroxide concentration in the recirculating stream of aqueous sulfuric acid of step (i) is about 2 wt % $H_2O_2$ to about 15 wt % $H_2O_2$.

7. The process of claim 1 wherein the hydrogen peroxide refortification is carried out on the recirculating aqueous sulfuric acid stream downstream of the diversion of a portion of the stream for neutralization.

8. The process of claim 1 wherein the sulfuric acid concentration in the recirculating stream of aqueous sulfuric acid is at least about 40 wt % $H_2SO_4$.

9. The process of claim 1 wherein the desulfurized flue gas stream contains less than half of the sulfur dioxide present in the incoming $SO_2$-containing flue gas stream.

10. The process of claim 1 wherein the desulfurized flue gas stream contains less than about 10% of the sulfur dioxide present in the incoming $SO_2$-containing flue gas stream.

11. The process of claim 1 wherein the water balance in the recirculating aqueous medium is maintained at a steady state by adjustment of one or more parameters selected from the group consisting of (i) evaporative removal of water from the spray tower, (ii) makeup water added to the portion of the recirculating aqueous stream diverted to the neutralization step, and (iii) the hydrogen peroxide concentration utilized for refortification of the recirculating aqueous medium.

12. The process of claim 1 wherein the dry gypsum product contains less than 10 wt % free water.

13. A flue gas desulfurization process which comprises (i) contacting a $SO_2$-containing flue gas stream with aqueous hydrogen peroxide and with a recirculating stream of an aqueous medium containing concentrated sulfuric acid of at least 40 wt % $H_2SO_4$, under conditions such that $SO_2$ is absorbed from the flue gas to yield a desulfurized flue gas stream and such that the absorbed $SO_2$ reacts with the hydrogen peroxide to produce additional sulfuric acid in the recirculating stream;

(ii) diverting a portion of the recirculating aqueous sulfuric acid stream for recovery of the additional sulfuric acid as gypsum in a neutralization step, in which sufficient neutralizing agent selected from limestone, lime and calcium hydroxide is introduced into the diverted aqueous sulfuric acid stream portion medium to neutralize the sulfuric acid present and produce a gypsum product; and (iii) evaporating free water from the diverted and neutralized portion of the recirculating aqueous sulfuric acid stream, using the heat of reaction generated during the neutralization step, to yield a gypsum product that is substantially dry.

14. The process of claim 13 which further comprises removing entrained particulate matter from the $SO_2$-containing flue gas stream prior to its desulfurization.

15. The process of claim 13 where the $SO_2$-containing flue gas stream is contacted with the aqueous hydrogen peroxide and recirculating aqueous medium stream in a spray tower.

16. The process of claim 13 wherein the neutralizing agent is limestone.

17. The process of claim 13 wherein the aqueous hydrogen peroxide concentration of step (i) is about 5 wt % $H_2O_2$ to about 50 wt % $H_2O_2$.

18. The process of claim 13 wherein the aqueous hydrogen peroxide concentration of step (i) is about 8 wt % $H_2O_2$ to about 35 wt % $H_2O_2$.

19. The process of claim 13 wherein the sulfuric acid concentration in the recirculating stream of aqueous sulfuric acid is at least about 40 wt % $H_2SO_4$.

20. The process of claim 13 wherein the desulfurized flue gas stream contains less than half of the sulfur dioxide present in the incoming $SO_2$-containing flue gas stream.

21. The process of claim 13 wherein the desulfurized flue gas stream contains less than 10% of the sulfur dioxide present in the incoming $SO_2$-containing flue gas stream.

* * * * *

UNITED STATES PATENT AND TRADEMARK OFFICE
CERTIFICATE OF CORRECTION

| | | |
|---|---|---|
| PATENT NO. | : 7,998,446 B2 | Page 1 of 1 |
| APPLICATION NO. | : 12/111732 | |
| DATED | : August 16, 2011 | |
| INVENTOR(S) | : Pfeffer et al. | |

It is certified that error appears in the above-identified patent and that said Letters Patent is hereby corrected as shown below:

Column 15, line 46, delete "about"

Column 16, line 11, change "H9SO4" to --$H_2SO_4$--

Column 16, line 21, delete "medium"

Signed and Sealed this
Fourth Day of October, 2011

David J. Kappos
*Director of the United States Patent and Trademark Office*